(12) United States Patent
Katsunuma

(10) Patent No.: US 7,173,695 B2
(45) Date of Patent: Feb. 6, 2007

(54) SPECTROSCOPE WITH THERMAL COMPENSATION MECHANISM

(75) Inventor: Atsushi Katsunuma, Saitamu-ken (JP)

(73) Assignee: Nikon Corporation, Tokyo (JP)

( * ) Notice: Subject to any disclaimer, the term of this patent is extended or adjusted under 35 U.S.C. 154(b) by 374 days.

(21) Appl. No.: 10/502,345

(22) PCT Filed: Dec. 25, 2002

(86) PCT No.: PCT/JP02/13506

§ 371 (c)(1),
(2), (4) Date: Jul. 23, 2004

(87) PCT Pub. No.: WO03/062776

PCT Pub. Date: Jul. 31, 2003

(65) Prior Publication Data

US 2005/0088649 A1    Apr. 28, 2005

(30) Foreign Application Priority Data

Jan. 24, 2002  (JP)  ............... 2002-015920

(51) Int. Cl.
*G01J 3/28* (2006.01)
(52) U.S. Cl. .................... 356/326; 356/328
(58) Field of Classification Search ............. 356/326, 356/328, 334; 403/30
See application file for complete search history.

(56) References Cited

U.S. PATENT DOCUMENTS

| | | | |
|---|---|---|---|
| 5,604,589 A | 2/1997 | Kraiczek et al. | 356/328 |
| 5,615,010 A | 3/1997 | Kraiczek et al. | 356/328 |

FOREIGN PATENT DOCUMENTS

| | | |
|---|---|---|
| CA | 2303613 | 10/2000 |
| EP | 0 727 681 | 8/1996 |
| EP | 1 041 372 | 10/2000 |
| EP | 0 727 680 | 6/2001 |
| JP | 57-125825 | 8/1982 |
| JP | 2-231536 | 9/1990 |

(Continued)

*Primary Examiner*—Gregory J. Toatley, Jr.
*Assistant Examiner*—Marissa J. Detschel
(74) *Attorney, Agent, or Firm*—Miles & Stockbridge P.C.

(57) ABSTRACT

A spectroscope is equipped with a temperature compensation mechanism that can reliably reduce a drift of a spectral image in the wavelength dispersion direction caused by a change in the environmental temperature irrespective of the form of the spectroscope. The spectroscope is provided with a first support member 17 that integrally supports an incidence member 11, a collective optical system 13 and a detection element 15, a second support member 21, made of a material different from the first support member, that supports a wavelength dispersion element 14, and a transmission member 24, 25 that transmits a contraction/expansion amount of the first support member to the second support member when environmental temperature changes. The second support member includes a deformation member 28 that elastically deforms, when environmental temperature changes, in accordance with a difference between its own contraction/expansion amount and the contraction/expansion amount of the first support member and a rotation member 26 that rotates minutely in accordance with elastic deformation of the deformation member. The said wavelength dispersion element is mounted on the rotation member in such a way that its wavelength dispersion direction is oriented perpendicular to the axial direction of the rotation member.

20 Claims, 3 Drawing Sheets

FOREIGN PATENT DOCUMENTS

| | | |
|---|---|---|
| JP | 6-331850 | 12/1994 |
| JP | 8-254463 | 10/1996 |
| JP | 9-15048 | 1/1997 |
| JP | 9-184806 | 7/1997 |
| JP | 9-218091 | 8/1997 |
| JP | 2000-298066 | 10/2000 |
| JP | 2001-108523 | 4/2001 |
| JP | 2001-188023 | 7/2001 |
| JP | 2002-31572 | 1/2002 |

SPECTROSCOPE WITH THERMAL COMPENSATION MECHANISM

TECHNICAL FIELD

The present invention relates to a spectroscope that utilizes a wavelength dispersion element such as a grating or a prism.

Background Art

Spectroscopes utilizing a wavelength dispersion element have been widely used in various fields such as physical analysis or chemical analysis. However, since the accuracy of wavelength measurement by a spectroscope is likely to be unstable due to influence of a change in the environmental temperature, the environmental temperature is kept constant in principle, when a spectroscope is used. As long as the environmental temperature is kept constant, a drift of a spectral image of the light incident on the spectroscope in the wavelength dispersion direction can be almost avoided and the accuracy of wavelength measurement by the spectroscope can be made stable.

However, depending on the environment, it is sometimes difficult to keep a constant temperature. In view of this, in recent years it has been desired to design spectroscopes in such a way that a spectral image will not drift in the wavelength dispersion direction even if the environmental temperature changes. Most of spectroscopes equipped with a temperature compensation mechanism that have already been proposed use a concave surface reflection type grating as a wavelength dispersion element and a diode array as a detector for detecting a spectral image.

For example, Japanese Patent Application Laid-Open No. 8-254463 and Japanese Patent Application Laid-Open No. 9-218091 teach to reduce a drift of a spectral image due to a change in the environmental temperature by selecting the thermal expansion coefficient of a grating holder and a casing in such a way as to match with the thermal expansion coefficient of a diode array, and matching the shape of the grating holder with the casing.

Furthermore, Japanese Patent Application Laid-Open No. 2000-298066 teach to reduce a drift of spectral images due to a change in the environmental temperature by inventively arranging the way of holding a grating and a diode array and optimizing a positioning structure for a grating holding member, a diode array holding member and a carrier.

However, the above-mentioned temperature compensation technologies proposed in the prior art spectroscopes equipped with a temperature compensation mechanism are for exclusive use in spectroscopes that use a concave surface reflection type grating as a wavelength dispersion element and a diode array as a detector. Therefore, it is impossible to apply the above-described temperature compensation technologies to spectroscopes of other various types. If those technologies are applied to a spectroscope of a different scheme by any means, the structure of the spectroscope will be complicated.

DISCLOSURE OF THE INVENTION

An object of the present invention is to provide a spectroscope equipped with a temperature compensation mechanism capable of reducing a drift of spectral images in the wavelength dispersion direction due to a change in the environmental temperature reliably irrespective of the form of the spectroscope.

A spectroscope according to the first aspect of the present invention comprises an incidence member for introducing light to be measured, a wavelength dispersion element for dispersing said light to be measured from said incidence member in accordance with its wavelengths, a collective optical system that collects said light to be measured having been dispersed by said wavelength dispersion element to form a spectral image, and a detection element that detects said spectral image, characterized by that said wavelength dispersion element is adapted to be rotatable, and a rotation mechanism for rotating said wavelength dispersion element in accordance with a change in environmental temperature is provided so as to cancel a drift of said spectral image in a wavelength dispersion direction caused by a change in environmental temperature.

Preferably, in the spectroscope according to the first aspect of the present invention, a reflective grating is used as said wavelength dispersion element and a rotation amount $\Delta a$ of said wavelength dispersion element per 1° C. temperature change is expressed by the following formula:

$$\Delta a = \Delta s/f/(1+\cos\alpha/\cos\beta),$$

where $\Delta s$ is a drift amount of said spectral image per 1° C. temperature change, f is the focal length of said collective optical system, $\alpha$ is the incidence angle of the light to be measured incident on said wavelength dispersion element, and $\beta$ is the diffraction angle of diffracted light emergent from said wavelength dispersion element. Here, the angles $\alpha$ and $\beta$ are measured from a normal line a grating surface of said wavelength dispersion element as a reference.

A spectroscope according to the second aspect of the present invention comprises an incidence member for introducing light to be measured, a wavelength dispersion element for dispersing said light to be measured from said incidence member in accordance with its wavelengths, a collective optical system that collects said light to be measured having been dispersed by said wavelength dispersion element to form a spectral image, a detection element that detects said spectral image, a first support member that supports said incidence member, said collective optical system and said detection element integrally, a second support member, made of a material different from said first support member, that supports said wavelength dispersion element, and a transmission member that transmits a contraction/expansion amount of said first support member to said second support member when environmental temperature changes, wherein said second support member includes a deformation member that elastically deforms, when environmental temperature changes, in accordance with a difference between the contraction/expansion amount of said first support member transmitted from said transmission member and a contraction/expansion amount of said second support member and a rotation member that rotates minutely in accordance with elastic deformation of said deformation member, and said wavelength dispersion element is mounted on said rotation member in such a way that its wavelength dispersion direction is oriented perpendicular to the axial direction of said rotation member.

In a preferable mode of the spectroscope according to the second aspect of the present invention, rotation angle and rotation direction of said rotation member upon change in environmental temperature are arranged in advance so as to cancel a drift of said spectral image in the wavelength dispersion direction.

In a preferable mode of the spectroscope according to the second aspect of the present invention, said second support member is a V-shaped member in which two arm members are joined via said deformation member of a thin form, one of said two arm members constituting said rotation member, and said transmission member is a member that connects both end portions of said V-shaped member and said first support member and changes the angle formed by said two arm members in accordance with contraction/expansion of said first support member.

In a preferable mode of the spectroscope according to the second aspect of the present invention, the coefficient of linear expansion ρb of said first support member, the coefficient of linear expansion ρm of said second support member, the length y of one of said two arms, the length z of the other of said two arms and the angle a formed by said two arms satisfy the following formulas:

$$Y/z = \{A \pm \sqrt{(A^2 - 4)}\}/2$$

$$A = 2 \cos a + \sin a \cdot \Delta a/(\rho b - \rho m),$$

where Δa is the rotation angle of said rotation member that can cancel a drift of said spectral image in the wavelength dispersion direction per 1° C. environmental temperature change.

EMBODIMENT OF THE INVENTION

In the following, an embodiment of the present invention will be described in detail with reference to the drawings.

Figure 1:
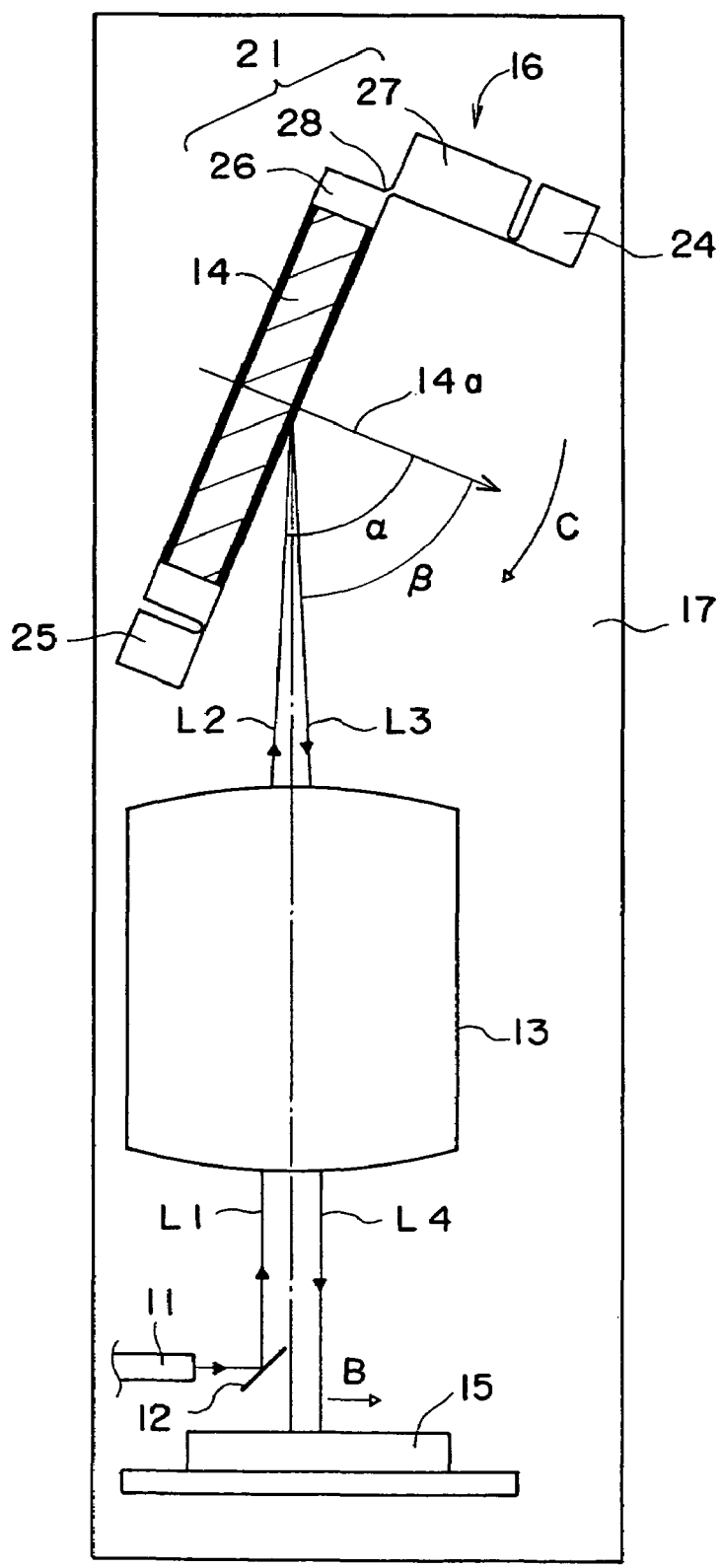
FIG. 1 shows the overall structure of a spectroscope 10 according to an embodiment.

As shown in FIG. 1, a spectroscope 10 according to this embodiment is composed of an optical fiber 11, a mirror 12, a Littrow lens 13, a grating 14, a one-dimensional line sensor 15, a grating mount 16 and a base member 17. In addition, a light source that is not shown in the drawing is provided in the upstream of the optical fiber 11. Among the optical elements (11 to 15) that constitute the spectroscope 10, the optical fiber 11, the mirror 12, the Littrow lens 13 and the one-dimensional line sensor 15 are disposed on the base member 17. The grating 14 is disposed on the grating mount 16, which is disposed on the base member 17.

The spectroscope 10 of this embodiment is a spectroscope having a temperature compensation function, and it can be used under the environmental temperature range of −20° C. to +60° C.

Firstly, the structure and the function of the optical elements (11 to 15) will be described, and subsequently the grating mount 16 and the base member 17 will be specifically described.

The optical fiber 11 is a member (e.g. a single mode fiber) used for introducing light to be measured from the light source (not shown) into the interior of the spectroscope 10. The diameter of the optical fiber at the light emitting portion is, for example, 10 μm. The optical fiber 11 corresponds to the "incidence member" recited in the claims.

The mirror 12 is an optical element for reflecting light to be measured coming from the optical fiber 11 to guide it to the Littrow lens 13.

The Littrow lens 13 has a lens having the function of collimating the light to be measured L1 coming from the mirror 12 and the function of collecting diffracted light L3 (which will be described later) coming from the grating 14 to form a spectral image (the focal length of the Littrow lens being e.g. 50 mm). The light to be measured L2 collimated by the Littrow lens 13 is guided to the grating 14, and the light to be measured L4 collected by the Littrow lens 13 is guided to the one-dimensional line sensor 15. The Littrow lens 13 corresponds to the "collective optical system" recited in the claims.

The grating 14 is a reflective planar diffraction grating in which a large number of elongated grooves are arranged one-dimensionally. The direction in which the large number of grooves are arranged corresponds to the wavelength dispersion direction of the grating 14. The grating 14 disperses the light to be measured L2 guided from the optical fiber 11 by means of the mirror 12 and the Littrow lens 13 depending on the wavelength. The light to be measured after undergoing dispersion by the grating 14 constitutes the aforementioned diffracted light L3. The grating 14 corresponds to the "wavelength dispersion element" recited in the claims.

In this embodiment, the Littrow lens 13 and the grating 14 constitutes a both side telecentric optical system. In other words, the grating is regarded as an aperture stop and it is disposed at a focal position of the Littrow lens 13.

The one-dimensional line sensor 15 has a light-receiving surface on which a large number of light receiving portions are arranged one-dimensionally. The one-dimensional line sensor 15 is arranged in such a way that the light receiving surface coincides with a focal position of the Littrow lens 13 (i.e. the position at which a spectral image is formed). The one-dimensional line sensor 15 is a detection element for detecting a spectral image formed by the Littrow lens 13. The direction in which the large number of light-receiving portions are arranged corresponds to the wavelength dispersion direction of the grating 14.

The width in the wavelength dispersion direction of each light-receiving portion is designed in accordance with the wavelength resolution required for detection of spectral images (for example, 25 μm). The number of the light-receiving elements arranged on the light-receiving surface of the one-dimensional line sensor 15 is designed in accordance with the wavelength range required for detection of spectral images in such a way that detection is made possible all through that wavelength range.

With the aforementioned optical elements (11 to 15), the light to be measured entering from the optical fiber 11 into the interior of the spectroscope 10 is collimated by the Littrow lens 13, then diffracted by the grating 14 and then returning back to the Littrow lens 13 so as to be collected. As a result, a spectral image is formed on the light-receiving surface of the one-dimensional line sensor 15, and the spectral image is detected by the light-receiving portions arranged on the light-receiving surface.

In the case that the light to be measured incident on the spectroscope 10 is monochromatic light (light having a certain single wavelength), the spectral image will be of a spot-like shape substantially similar to the light emitting portion of the optical fiber 11. In the case that the light to be measured contains multiple types of light having different wavelengths, the spectral image will be of a shape that extends along the wavelength dispersion direction. In some cases, a situation in which a large number of spot-like spectral images are discretely arranged along the wavelength dispersion direction will occur.

If the spectral image drifts in the wavelength dispersion direction on the light-receiving surface of the one-dimensional line sensor 15, measurement accuracy of the spectroscope 10 is deteriorated. Such a drift of the spectral image in the wavelength dispersion direction is likely to occur when the environmental temperature changes, and the following reasons (1) to (5) are assumed to be principal contributing factors for the drift.

(1) variation of the focal length of the Littrow lens 13; (2) variation of the refractive index of the air; (3) variation of the grating constant due to contraction/expansion of the grating 14; (4) positional shift of the optical fiber 11 in the wavelength dispersion direction due to contraction/expansion of the base member 17; and (5) rotation about the groove line direction as the center.

However, among the above-mentioned factors (1) to (5), the factor (1), that is, variation of the focal length of the Littrow lens 13 can be reduced by optical design down to a small degree that does not matter practically. The factor (2), that is, variation of the refractive index of the air does not matter as long as the change in the environmental temperature is as small as about 100° C. In other words, even if the environmental temperature changes about 100° C., the degree of the wavelength variation of light in the air is negligible.

Consequently, the contributing factors to the drift of the spectral image that should be practically taken into account are three factors, namely, (3) variation of the grating constant of the grating 14, (4) positional shift of the optical fiber 11 in the wavelength dispersion direction, and (5) rotation about the groove line direction as the center.

In this embodiment, it is assumed that the spectroscope 10 is designed in such a way that when the environmental temperature rises from the lowest temperature (−20° C.) to the highest temperature (+60° C.) by 80° C., the spectral image will drift toward the shorter wavelength side by 20 μm due to the aforementioned factors (3) and (4). In connection with this, the shorter wavelength side is the direction indicated by arrow B in FIG. 1.

The drift of the spectral image due to a change in the environmental temperature is substantially proportional to the change in the temperature. Specifically, the drift amount Δs per 1° C. temperature change is 20 μm/80° C.=0.25 μm/° C. This drift amount is not negligible as compared to the width (25 μm), in the wavelength dispersion direction, of one light-receiving portion in the one-dimensional line sensor 15.

As mentioned before, in the case that the light to be measured incident on the spectroscope 10 contains multiple types of light having different wavelengths, the spectral image will be of a shape that extends along the wavelength dispersion direction, or a situation in which a large number of spot-like images are discretely arranged along the wavelength dispersion direction will occur. Strictly speaking, the drift amount varies slightly depending on the wavelength. However, the variation is negligibly small.

In view of this, it is assumed in this embodiment that among the lights to be measured incident on the spectroscope 10, the light having a wavelength in question (for example, the light of the central wavelength) and the light having a wavelength in the neighborhood of the wavelength in question show the same behavior under a change in the environmental temperature. In other words, it is assumed that they drift by the same amount Δs (0.25 μm/° C.).

As described before, with a rise in the environmental temperature, the spectral image drifts toward the shorter wavelength side (in the direction indicated by arrow B) by 0.25 μm/° C. due to the aforementioned factors (3) and (4). In addition, and the other contributing factor to the drift of the spectral image is (5) rotation about the groove line direction as the center, as also described before.

In the spectroscope 10 according to this embodiment, the grating 14 is rotated in such a way that the drift Δs (0.25 μm/° C. toward the shorter wavelength side) of the spectral image due to the aforementioned factors (3) and (4) is cancelled. The mechanism for rotating the grating 14 (the grating mount 16 and the base member 17) will be described in detail later.

When the grating 14 is rotated about the groove line direction (i.e. the direction perpendicular to the plane of the drawing sheet of FIG. 1), diffracted light L3 emergent from the grating 14 is deflected, so that the spectral image drifts in the wavelength dispersion direction on the light-receiving surface of the one-dimensional line sensor 15.

In connection with this, when the grating 14 is rotated in the direction in which the incidence angle α of the light to be measured L2 incident on the grating 14 decreases (namely, the direction indicated by arrow C in FIG. 1), the spectral image drifts toward the longer wavelength side (the direction opposite to the direction indicated by arrow B) with this rotation. This is a drift that cancels the drift Δs caused by the aforementioned factors (3) and (4). The aforementioned incidence angle α is measured from the normal line 14a of the grating 14.

Typically, the grating 14 is a reflective type, and in that case, the rotation angle Δa of the grating that can cancel the drift Δs (=0.25 μm/° C.) can be expressed by the following formula (1) using the focal length f of the Littrow lens 13, the incidence angle α of the light to be measured L2 incident on the grating 14 and the diffraction angle β of the diffracted light L3 emergent from the grating 14, where the diffraction angle β is also measured from the normal line 14a of the grating 14.

$$\Delta a = \Delta s / f (1 + \cos \alpha / \cos \beta) \qquad (1)$$

The above formula (1) is valid under the assumption that the wavelength variation of light within the air is negligible. The rotation angle Δa of the grating 14 is a rotation angle required per 1° C. temperature variation.

A specific rotation angle Δa calculated by the above formula (1) is $\Delta a = 2.76 \times 10^{-6}$ radian/° C., where values Δs=0.25 μm/° C., f=50 mm, α=70°, β=65° are used. The values of α and β are angles with respect to the light having a wavelength in question (for example, the light having the central wavelength).

As per the above, when the environmental temperature changes, it is possible to cancel a drift As of the spectral image caused by the aforementioned factors (3) and (4) by rotating the grating 14 by the aforementioned rotation angle Δa in the direction in which the incidence angle α decreases (i.e. in the direction indicated by arrow C).

Next, the mechanism for rotating the grating 14 (i.e. the grating mount 16 and the base member 17) will be described in detail. This mechanism is characterized by that it utilizes a difference in the coefficient of linear expansion between the base member 17 and the grating mount 16.

The base member 17 integrally supports the optical fiber 11, the mirror 12, the Littrow lens 13 and the one-dimensional line sensor 15. The base member 17 corresponds to the "first support member" recited in the claims. In this embodiment, the base member 17 is made of an aluminum alloy having a coefficient of linear expansion ρb (=24.3× $10^{-6}$ degree$^{-1}$).

When the environmental temperature changes, the base member 17 contracts or expands in accordance with its coefficient of linear expansion ρb. In this connection, the relative positional relationship of the optical fiber 11, the mirror 12, the Littrow lens 13 and the one-dimensional line sensor 15 disposed on the base member 17 changes isotropically with the angular relationship being kept constant.

Figure 2A:
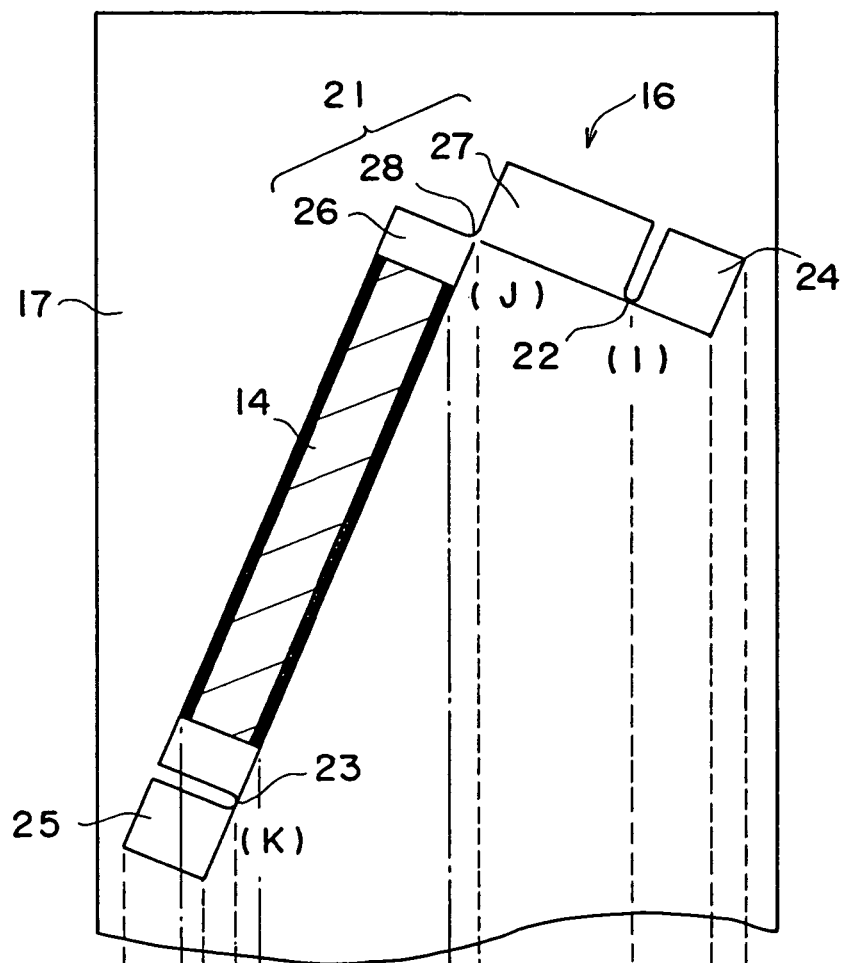
FIGS. 2A and 2B show the structure of a grating mount 16.
Figure 2B:
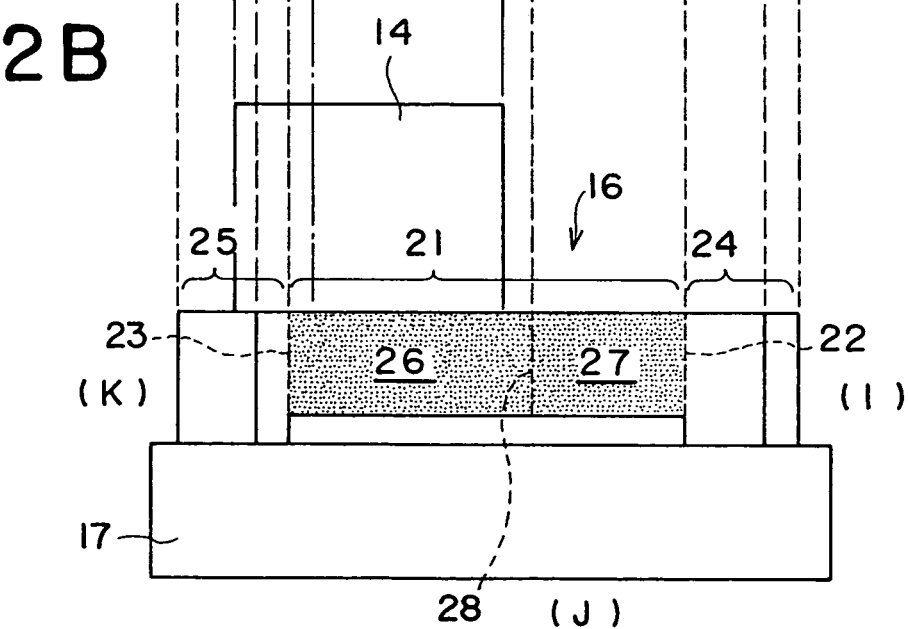

As shown in FIGS. 2A and 2B, the grating mount 16 is composed of a V-shaped member 21 for supporting the grating 14 and joint members 24 and 25 for joining both end portions 22 and 23 of the V-shaped member 21 with the base member 17. FIG. 2A is a top view and FIG. 2B is a side view. In FIG. 2B, the portion corresponding to the V-shaped member 21 is represented by halftone dots.

In this embodiment, the grating mount 16 is made of an aluminum alloy having a coefficient of linear expansion ρm (=23.6×10$^{-6}$degree$^{-1}$). The V-shaped member 21 of the grating mount 16 corresponds to the "second supporting member" recited in the claims. The joint members 24 and 25 correspond to the "transmission member".

When the environmental temperature changes, the grating mount 16 contracts or expands in accordance with its coefficient of linear expansion ρm. Since the coefficient of linear expansion ρm of the grating mount 16 differs from the coefficient of linear expansion ρb of the base member, the amount of contraction/expansion caused by a change in the environmental temperature is different between the grating mount 16 and the base member 17.

Here, the V-shaped member 21 will be described in further detail.

The V-shaped member 21 is composed of two arm members 26 and 27 joined by a thin deformation member 28 that can deform elastically. In addition, as described above, the V-shaped member 21 is joined with the base member 17 at its both end portions 22 and 23 by means of the joint members 24 and 25 respectively. The end portions 22 and 23 of the V-shaped member 21 are thin deformation members that can deform elastically similar to the aforementioned deformation member 28.

Therefore, when the base member 17 contracts or expands with a change in the environmental temperature in accordance with its coefficient of linear expansion ρb, the contraction/expansion amount of the base member 17 is transmitted to the V-shaped member 21 via the joint member 24 and 25. Specifically, the distance between the joint members 24 and 25 changes by an amount corresponding to the contraction/expansion of the base member 17 and the distance between both end portions 22 and 23 of the V-shaped member 21 also changes.

Both end portions 22 and 23 of the V-shaped member 21 and the deformation member 28 elastically deform in accordance with the difference between their own contraction/expansion amount and the contraction/expansion amount of the base member 17. All of these elastic deformations are absorbed by a change in the bend angle. In addition, the arm members 26 and 27 of the V-shaped member 21 contract or expand in accordance with their own coefficient of linear expansion ρm.

Figure 3:
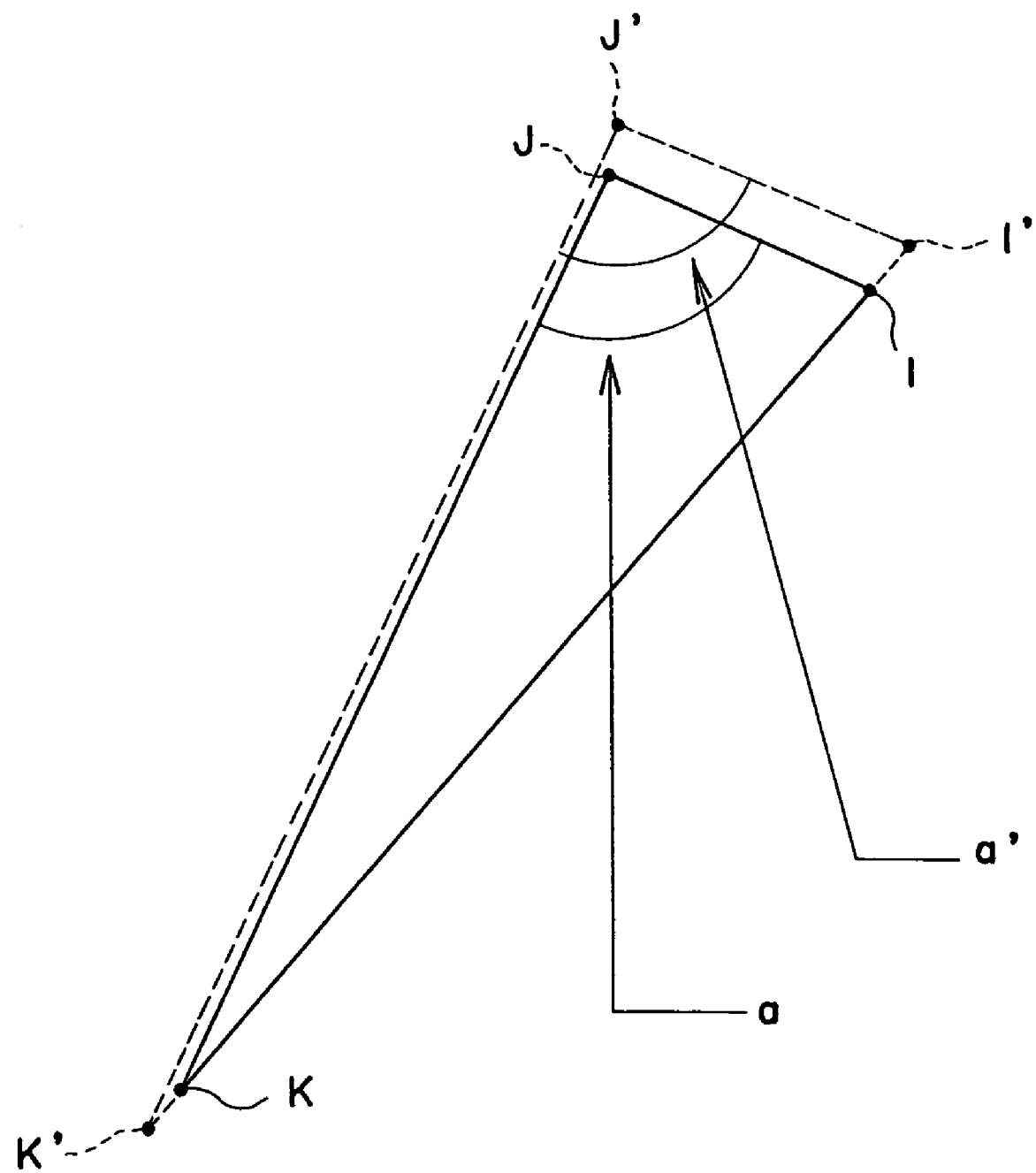
FIG. 3 illustrates a deformation of the grating mount 16.

Here, letting "I" be the center of one end portion of the V-shaped member 21, "K" be the center of the other end portion 23 and "J" be the center of the deformation member 28, deformation of the V-shaped member 21 caused by a change in the environmental temperature will be considered while focusing on the triangle IJK (shown in FIG. 3) obtained by connecting the three centers I, J and K. In other words, deformation of the triangle IJK will be considered.

When the environmental temperature changes, the length of the side IK (i.e. the distance between both the end portions 22 and 23) of the triangle IJK changes in accordance with the contraction/expansion amount of the base member 17. On the other hand, the length of the other two sides, namely the length of the side IJ (i.e. the length of the arm member 27) and the length of the side JK (i.e. the length of the arm member 26) change in accordance with the contraction/expansion amount of themselves or contraction/expansion amount of the V-shaped member 21.

Therefore, the triangle I'J'K' after the change in the environmental temperature is not a similar figure to the original triangle IJK. Furthermore, the apex angle a' (i.e. angle I'J'K') is different from the apex angle a (i.e. angle IJK). In connection with this, the apex angle a' and the apex angle a represent the bend angle of the deformation member 28. The change in the bend angle of the deformation member (apex angle a→a') is an elastic deformation.

Furthermore, when the apex angle a of the triangle IJK changes in accordance with an elastic deformation of the deformation member 28, the angle formed by the two sides JK and JI (i.e. the arm member 26 and the arm member 27) that form the apex angle a changes. Consequently, the sides JK and JI rotate minutely. The axis of this minute rotation is perpendicular to the plane defined by the triangle IJK (i.e. the plane parallel to the plane of the drawing sheet).

In addition, the direction of minute rotation (rotation direction) of the side JK of the triangle IJK when the environmental temperature rises coincides with the direction indicated by arrow C in FIG. 1 (i.e. the direction in which the incidence angle α decreases). This can be understood by considering the fact that its own coefficient of linear expansion ρm is smaller than the coefficient of linear expansion ρb of the base member 17 and that the apex angle a of the triangle IJK increases with an increase in the environmental temperature.

Therefore, the grating 14 is to be mounted on one arm member 26 of the V-shaped member 21 in such a way that the wavelength dispersion direction is oriented in the direction perpendicular to the axial direction (i.e. the direction perpendicular to the plane of the drawing sheet) of the arm member 26. Consequently, the groove line direction of the grating 14 becomes parallel to the axial direction of the arm member 26.

The arm member 26 and the grating 14 are bonded by means of, for example, an adhesive having elasticity so that deflection will not be caused by a difference in the coefficient of linear expansion of them. The arm member 26 of the V-shaped member 21 corresponds to the "rotation member" recited in the claims.

The grating 14 mounted on the arm member 26 in this way always rotates minutely about the groove direction of the grating 14 together with the arm member 26. In addition, when the environmental temperature rises, the grating 14 rotates minutely in the direction in which the incidence angle α decreases (i.e. the direction indicated by arrow C).

The rotation angle Δa of the grating 14 that can cancel the drift Δs(=0.25 μm/° C.) of the spectral image caused by the aforementioned factors (3) and (4), namely the rotation angle Δa required when the environmental temperature changes by 1° C. is expressed by formula (1) presented before, and the specific value of Δa is 2.76×10$^{-6}$radian.

Therefore, if the arm member 26 of the V-shaped member 21 that supports the grating 14 is adapted to rotate by the aforementioned rotation angle Δa per 1° C. temperature change, the grating 14 will actually rotate by the rotation angle Δa.

Letting Δa=a'−a (Δa: the rotation angle of the arm member 26 per 1° C. temperature change), the rotation angle Δa, the coefficient of linear expansion ρb of the base member 17, the coefficient of linear expansion ρm of the grating mount 16, the length y of the arm member 26 (or the side JK), the length z of the arm member 27 (or the side JI) and the angle a (or angle IJK) formed between the arms 26 and 27 satisfy the following formulas (2) and (3).

$$y/z = \{A \pm \sqrt{(A^2-4)}\}/2 \quad (2)$$

$$A = 2\cos a + \sin a \cdot \Delta a / (\rho b - \rho m) \quad (3)$$

By substituting specific numerical values of the spectroscope according to this embodiment (a=90°, Δa=2.76×10⁻⁶ radian, ρb=24.3×10⁻⁶degree⁻¹ and ρm=23.6×10⁻⁶degree⁻¹) into formulas (2) and (3), the value of parameter A is obtained as A=3.94, and consequently, the ratio (y/z) of the length of the arm member 26 (or the side JK) and the length of the arm member 27 (or the side JI) is obtained as y/z=3.67 (or 1/3.67).

It is possible to realize minute rotation the arm member 26 in the direction indicated by arrow C by the aforementioned rotation angle Δa per 1° C. environmental temperature rise by determining the length y, z of the arm members 26 and 27 (or the sides JK and JI) based on the obtained result and arranging the V-shaped member 21 in such a way that the arm members 26 and 27 form an angle of 90°.

As a result, the grating 14 mounted on the arm member 26 also rotates in the direction indicated by arrow C (i.e. the direction in which the incidence angle α decreases) by the aforementioned rotation angle Δa per 1° C. environmental temperature rise. Therefore, the drift As (0.25 μm/° C. toward the shorter wavelength side) of the spectral image caused by the aforementioned factors (3) and (4) can be canceled.

In the spectroscope 10 according to this embodiment, when the environmental temperature changes, the base member 17 and the grating mount 16 (or the V-shaped member 21) contract or expand by different amounts and the grating 14 minutely rotates by a predetermined angle in accordance with the difference in the contraction/expansion amounts to cancel a drift of the spectral image in the wavelength dispersion direction for sure. Consequently, it is possible to keep the position of the spectral image on the light-receiving surface of the one-dimensional line sensor 15 at the same position even when the environmental temperature changes.

Thus, spectrum measurement of the light to be measured can be made possible with stable measurement accuracy even when it is difficult to keep the environmental temperature of the spectroscope 10 constant and the environmental temperature changes in the range of −20° C. to +60° C.

In addition, since there is no need for particular environmental temperature control or provision of a environmental temperature control function in the spectroscope 10, it is possible to realize a spectroscope 10 that is inexpensive and easy to use.

Furthermore, in the spectroscope 10 according to this embodiment, since a one-dimensional line sensor 15 is used as an element for receiving spectral images, spectral images of multiple wavelengths can be received simultaneously even in the state in which the grating 14 is fixed. In other words, when the light to be measured contains multiple lights of different wavelengths, the intensity of the light to be measured can be measured easily on wavelength by wavelength basis.

Such a spectroscope 10 is preferably used in a wavelength division multiplexing (WDM) optical communication system, as a device for separating light emitted from a light source in the form of a semiconductor laser (a light source in which predetermined lights of multiple frequencies are multiplexed) (e.g. 1.5 μm band) and for monitoring the intensity characteristic of each frequency (i.e. a wavelength monitor).

Generally, optical communication equipments are required to operate under harsh environmental temperature conditions. When the spectroscope 10 according to this embodiment is used as a wavelength monitor and measurement results obtained by the spectroscope 10 are fed back to the semiconductor laser, it is possible to keep the intensity of the light emitted from the semiconductor laser constant for each wavelength to thereby enable stable optical communication even if the environmental temperature changes.

Although the above embodiment has been described with reference to a spectroscope 10 that uses a reflective diffraction grating, the present invention can also be applied to a spectroscope that uses a transmissive diffraction grating. Furthermore, the present invention can also be applied to a spectroscope that uses a single concave surface diffraction grating in place of a planar diffraction grating and a Littrow lens. Still further, a collimating optical system and a collective optical system may be separately provided in place of a single Littrow lens. The collimating optical system and the collective optical system may be either dioptric systems or catoptric systems. Although a grating (i.e. diffracting grating) is used as a wavelength dispersion element, a prism may also be used.

The present invention can be easily applied to any of the above-mentioned various types of spectroscopes. Specifically, it is possible to cancel a drift of spectral images in the wavelength dispersion direction only by mounting a wavelength dispersion element of a spectroscope on a rotation member similar to the above-described arm member 26. Therefore, the structure of a spectroscope provided with a temperature compensation function according to the present invention will not be made complex.

However, when a wavelength dispersion element is mounted on a rotation member, the wavelength dispersion direction must be made perpendicular to the axial direction of the rotation member. In addition, it is also necessary to select various parameters such as the coefficient of linear expansion ρm of a supporting member (corresponding to the V-shaped member 21) that includes the rotation member and the coefficient of linear expansion ρb of a base member for supporting members (the optical fiber 11 etc.) other than the wavelength dispersion member appropriately. In addition, it is preferable to determine an optimum value for the rotation angle Δa of the wavelength dispersion element required for temperature compensation, upon designing an individual spectroscope.

Although in the above-described embodiment a one-dimensional line sensor 15 is used as an element for detecting a spectral image, an emission slit and a detector may be used in place of the one-dimensional line sensor 15. The emission slit (detection element) has an elongated aperture, which is disposed in such a way as to coincide with the position at which the spectral image is formed. Thus, a partial image of the spectral image that has been transmitted through the aperture is received by the detector.

In that arrangement, lights having different wavelengths can be measured by shifting the emission slit and the detector along the wavelength dispersion direction or rotating the wavelength dispersion element about an axis perpendicular to the wavelength dispersion direction. Spectroscopes having such a structure is also preferably used as the aforementioned wavelength monitor in a wavelength division multiplexed (WDM) optical communication system.

Furthermore, although an optical fiber 11 is used as an incidence member for causing the light to be measured to enter the spectroscope 10, an incidence slit may also be used in place of the optical fiber 11. The incidence slit has a single elongated aperture.

Although in the above-described embodiment, the Littrow lens 13 and the grating 14 constitute a both side telecentric optical system, the present invention is not restricted to this feature. The present invention can also be applied to structures in which the Littrow lens 13 and the grating 14 are out of telecentricity.

Although in the above-described embodiment, a reflective grating is used, the present invention can also be applied to structures that use a transmissive grating.

As has been described in the foregoing, the present invention can provide a simple spectroscope equipped with a temperature compensation mechanism that can reliably reduce a drift of a spectral image in the wavelength dispersion direction caused by a change in the environmental temperature irrespective of the form of the spectroscope.

What is claimed is:

1. A spectroscopic apparatus comprising:
   a wavelength dispersion element on which light having one or more wavelength components is incident from an incidence member, for exerting spectroscopic effect on said light;
   a first support member that supports said wavelength dispersion element indirectly; and
   a second support member disposed between said wavelength dispersion element and said first support member to connect said wavelength dispersion element and said first support member,
   wherein said second support member includes a rotation member for rotating said wavelength dispersion element in accordance with a difference in coefficient of linear expansion between said first support member and said second support member in environmental temperature.

2. A spectroscopic apparatus according to claim 1, further comprising a collective optical system that collects the light that has undergone said spectroscopic effect to form a spectral image, wherein rotation angle and rotation direction of said rotation member are arranged in advance so as to cancel a drift of said spectral image in the wavelength dispersion direction caused by change in environmental temperature.

3. A spectroscopic apparatus according to claim 2, wherein said rotation member cancels a drift of said spectral image in the wavelength dispersion direction based on a drift amount of said spectral image relative to a change in environmental temperature that has been measured in advance for said spectroscopic apparatus without the rotation member.

4. A spectroscopic apparatus according to claim 1, wherein said wavelength dispersion element is mounted on said rotation member in such a way that its wavelength dispersion direction is oriented perpendicular to the axial direction of said rotation member.

5. A spectroscopic apparatus according to claim 1, further comprising:
   an incidence member for causing light having at least one wavelength to enter said wavelength dispersion element; and
   a collimating optical system for collimating light from said incidence member to cause the light to enter said wavelength dispersion element,
   wherein said incidence member and said collimating optical system are supported by said first support member.

6. A spectroscopic apparatus according to claim 5, further comprising:
   a collective optical system for collecting light that has undergone spectroscopic effect by the wavelength dispersion element to form a spectral image; and
   a light receiving element for receiving said spectral image,
   wherein said collective optical system and said light receiving element are supported by said first support member.

7. A spectroscopic apparatus according to claim 6, wherein said collimating optical system and said collective optical system include at least one common lens.

8. A spectroscopic apparatus according to claim 6, wherein said light receiving element comprises a one-dimensional line sensor.

9. A spectroscopic apparatus according to claim 6, wherein said light receiving element comprises a plurality of light receiving portions arranged on a surface on which the spectral image is formed by the collective optical system, and light incident on each light receiving portion has a different wavelength.

10. A spectroscopic apparatus comprising:
    a wavelength dispersion element on which light having one or more wavelength components is incident from an incidence member, for exerting spectroscopic effect on said light;
    a first support member that supports said wavelength dispersion element indirectly;
    a second support member that supports said wavelength dispersion element; and
    a transmission member disposed between said first support member and said second support member to transmit a contraction/expansion amount of said first support member to said second support member when environmental temperature changes,
    wherein said second support member includes a deformation member that elastically deforms, when environmental temperature changes, in accordance with a difference between the contraction/expansion amount of said first support member transmitted from said transmission member and a contraction/expansion amount of said second support member and a rotation member that rotates minutely in accordance with elastic deformation of said deformation member.

11. A spectroscopic apparatus according to claim 10, wherein said second support member comprises a V-shaped member in which two arm members are joined via said deformation member of a thin form to form a V-shape as a whole, the angle formed by said two arm members being changed in accordance with contraction/expansion of said first support member and said V-shaped member.

12. A spectroscopic apparatus according to claim 11, wherein coefficient of linear expansion $\rho b$ of said first support member, coefficient of linear expansion $\rho m$ of said second support member, length y of one of said two arm members, length z of the other of said two arm members and angle a formed by said two arm members satisfy the following formulas:

$$y/z = \{A \pm \sqrt{(A^2-4)}\}/2$$

$$A = 2\cos a + \sin a \cdot \Delta a/(\rho b - \rho m),$$

where Δa is the rotation angle of said rotation member that cancels a drift of said spectral image in the wavelength dispersion direction per 1° C. environmental temperature change.

13. A spectroscopic apparatus according to claim 10, further comprising a collective optical system that collects the light that has undergone said spectroscopic effect to form a spectral image, wherein rotation angle and rotation direction of said rotation member are arranged in advance so as to cancel a drift of said spectral image in the wavelength dispersion direction caused by change in environmental temperature.

14. A spectroscopic apparatus according to claim 13, wherein said rotation member cancels a drift of said spectral image in the wavelength dispersion direction based on a drift amount of said spectral image relative to a change in environmental temperature that has been measured in advance for said spectroscopic apparatus without the rotation member.

15. A spectroscopic apparatus according to claim 10, wherein said wavelength dispersion element is mounted on said rotation member in such a way that its wavelength dispersion direction is oriented perpendicular to the axial direction of said rotation member.

16. A spectroscopic apparatus according to claim 10, further comprising:
   an incidence member for causing light having at least one wavelength to enter said wavelength dispersion element; and
   a collimating optical system for collimating light from said incidence member to cause the light to enter said wavelength dispersion element,
   wherein said incidence member and said collimating optical system are supported by said first support member.

17. A spectroscopic apparatus according to claim 16, further comprising:
   a collective optical system for collecting light that has undergone spectroscopic effect by the wavelength dispersion element to form a spectral image; and
   a light receiving element for receiving said spectral image,
   wherein said collective optical system and said light receiving element are supported by said first support member.

18. A spectroscopic apparatus according to claim 17, wherein said collimating optical system and said collective optical system include at least one common lens.

19. A spectroscopic apparatus according to claim 17, wherein said light receiving element comprises a one-dimensional line sensor.

20. A spectroscopic apparatus according to claim 17, wherein said light receiving element comprises a plurality of light receiving portions arranged on a surface on which the spectral image is formed by the collective optical system, and light incident on each light receiving portion has a different wavelength.

* * * * *